(12) United States Patent
Sugita et al.

(10) Patent No.: US 6,389,137 B1
(45) Date of Patent: May 14, 2002

(54) VIDEO SIGNAL TRANSMITTING METHOD, VIDEO SIGNAL OUTPUT DEVICE, VIDEO SIGNAL RECEIVER, VIDEO ANTI-DUPLICATION CONTROL SYSTEM, ADDITIONAL INFORMATION SUPERIMPOSING AND EXTRACTING SYSTEM AND VIDEO SIGNAL RECORDING MEDIUM

(75) Inventors: Takehiro Sugita, Kanagawa; Akira Ogino, Chiba; Takashi Usui, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/951,027

(22) Filed: Oct. 15, 1997

(30) Foreign Application Priority Data

Oct. 28, 1996 (JP) .......................................... P08-302439

(51) Int. Cl.$^7$ .......................... H04K 1/10; H04B 15/00; H04L 27/30
(52) U.S. Cl. .......................... 380/34; 375/208; 375/209; 375/210
(58) Field of Search ........................... 380/34; 375/208, 375/209, 210

(56) References Cited

U.S. PATENT DOCUMENTS

| | | | | |
|---|---|---|---|---|
| 3,984,624 A | | 10/1976 | Waggener ................... 178/5.6 |
| 5,062,122 A | * | 10/1991 | Pham et al. ................. 375/200 |
| 5,216,691 A | * | 6/1993 | Kaufmann ................... 375/206 |
| 5,243,423 A | * | 9/1993 | DeJean et al. .............. 348/473 |
| 5,276,859 A | * | 1/1994 | Reede ......................... 713/600 |
| 5,303,258 A | * | 4/1994 | Nakamura ................... 375/200 |
| 5,321,514 A | * | 6/1994 | Martinez ..................... 348/723 |
| 5,363,108 A | * | 11/1994 | Fullerton ..................... 342/27 |
| 5,375,140 A | * | 12/1994 | Bustamante et al. ........ 375/206 |
| 5,438,589 A | * | 8/1995 | Nakamura ................... 375/200 |
| 5,488,627 A | * | 1/1996 | Hardin et al. ............... 375/204 |
| 5,499,265 A | * | 3/1996 | Dixon et al. ................ 375/200 |
| 5,499,267 A | * | 3/1996 | Ohe et al. .................... 375/206 |
| 5,533,046 A | * | 7/1996 | Lund ........................... 375/200 |
| 5,546,424 A | * | 8/1996 | Miyake ....................... 375/206 |
| 5,596,599 A | * | 1/1997 | Saito ........................... 375/200 |
| 5,737,329 A | * | 4/1998 | Horiguchi .................... 370/342 |
| 5,754,650 A | * | 5/1998 | Katznelson ................... 380/15 |
| 5,768,560 A | * | 6/1998 | Lieberman et al. ......... 711/167 |
| 5,828,871 A | * | 10/1998 | Kawaguchi et al. ........ 713/600 |
| 5,848,155 A | * | 12/1998 | Cox ............................... 380/4 |
| 5,862,133 A | * | 1/1999 | Schilling ..................... 370/342 |
| 5,867,489 A | * | 2/1999 | Hershey et al. ............. 370/324 |
| 5,930,366 A | * | 7/1999 | Jamal et al. .................. 380/48 |

FOREIGN PATENT DOCUMENTS

| | | | |
|---|---|---|---|
| EP | 0360615 | 3/1990 | ............ H04N/7/08 |
| EP | 0400906 | 12/1990 | ............ H04N/5/91 |
| EP | 0574892 | 12/1993 | ............ H04N/9/80 |

* cited by examiner

Primary Examiner—Gilberto Barron, Jr.
Assistant Examiner—Douglas Meislahn
(74) Attorney, Agent, or Firm—Jay H. Maioli

(57) ABSTRACT

A playback device generates a Pseudo-random noise (PN) code sequence repeatedly with a predetermined period in synchronism with a video sync signal. An anti-duplication control signal is spectrally spread using this generated PN code sequence, is superimposed on the video signal, and is output. A PN code sequence having the same timing and code pattern as the PN code sequence used in the playback device is similarly generated based on the video sync signal on the receiving side which receives the output video signal. Using this PN code sequence, reverse spectral spread is performed, the anti-duplication control signal superimposed on the video signal is extracted, and anti-duplication control is performed according to the extracted anti-duplication control signal.

21 Claims, 11 Drawing Sheets

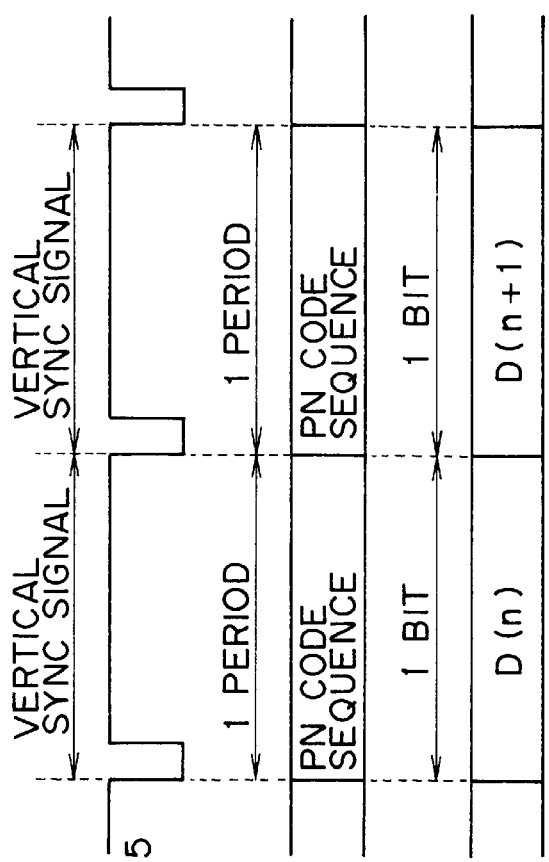

VERTICAL SYNC SIGNAL S5

CLOCK SIGNAL S6

PN CODE SEQUENCE S9

ANTI-DUPLICATION CONTROL SIGNAL S8

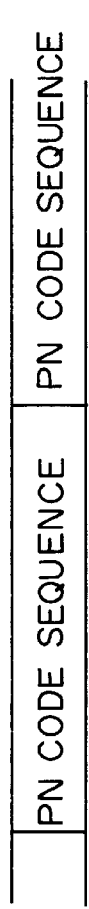
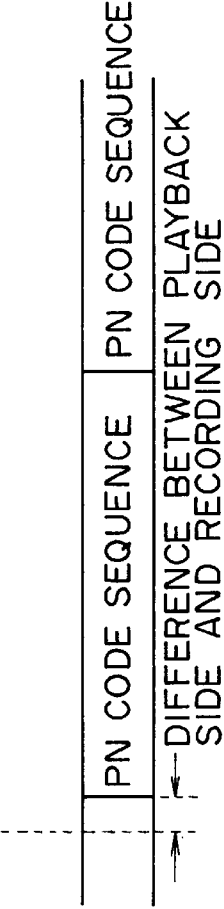
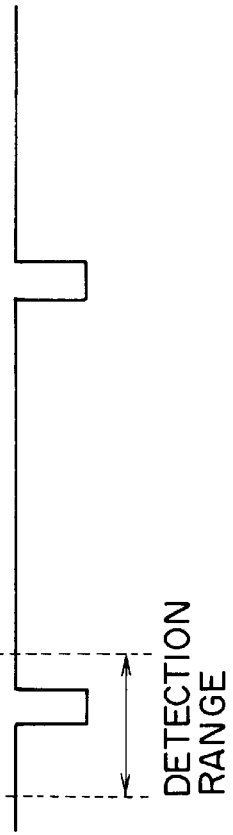
FIG. 6A  PN CODE SEQUENCE IN IMAGE SIGNAL S12
FIG. 6B  PN CODE SEQUENCE SYNCHRONIZED WITH DETECTED VERTICAL SYNC SIGNAL ON RECORDING SIDE
FIG. 6C  DETECTED VERTICAL SYNC SIGNAL

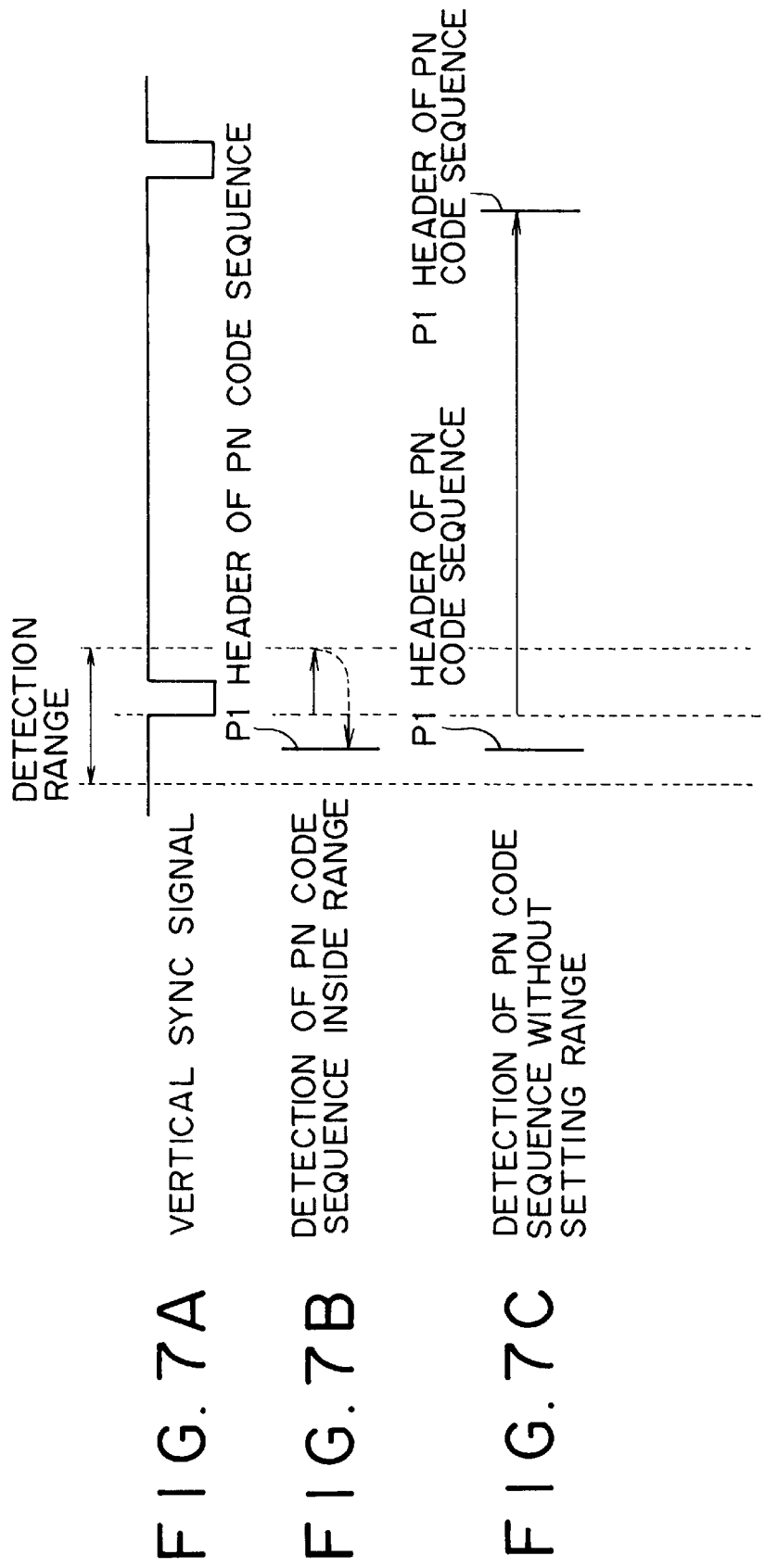

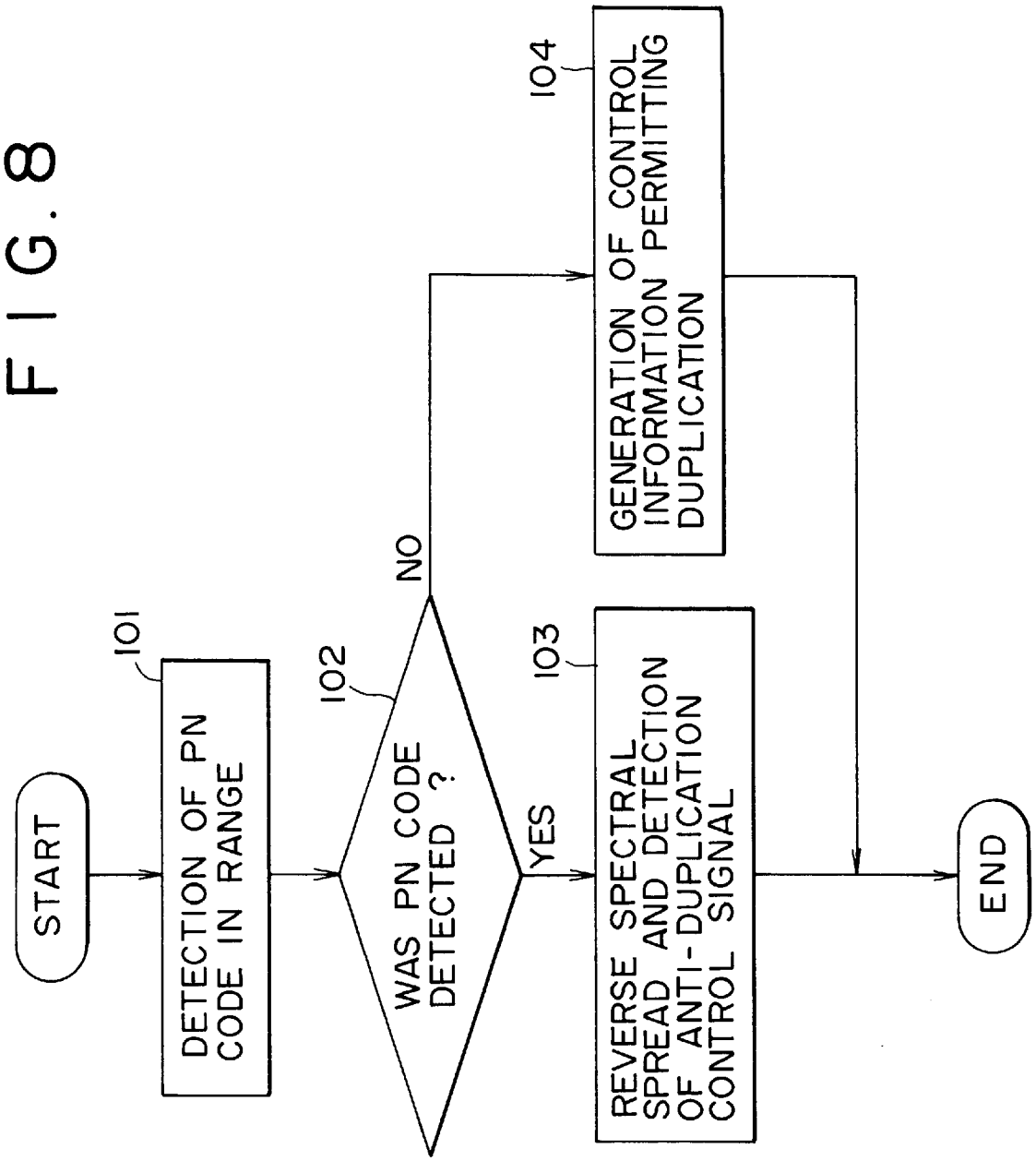

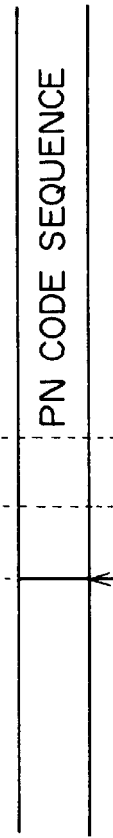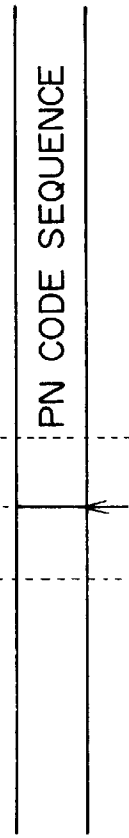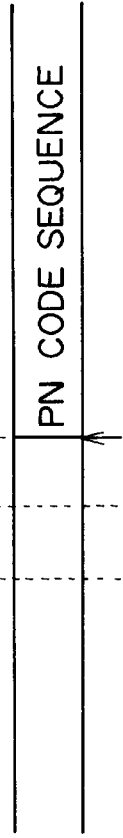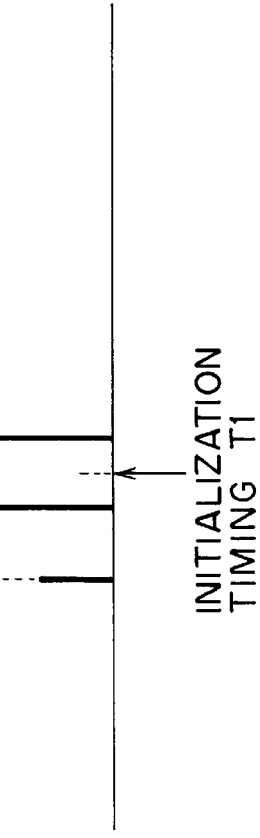
FIG.10A VERTICAL SYNC SIGNAL
FIG.10B PN CODE DETECTION TIMING 1
FIG.10C PN CODE DETECTION TIMING 2
FIG.10D PN CODE DETECTION TIMING 3
FIG.10E CORRELATION VALUES FOR EACH TIMING

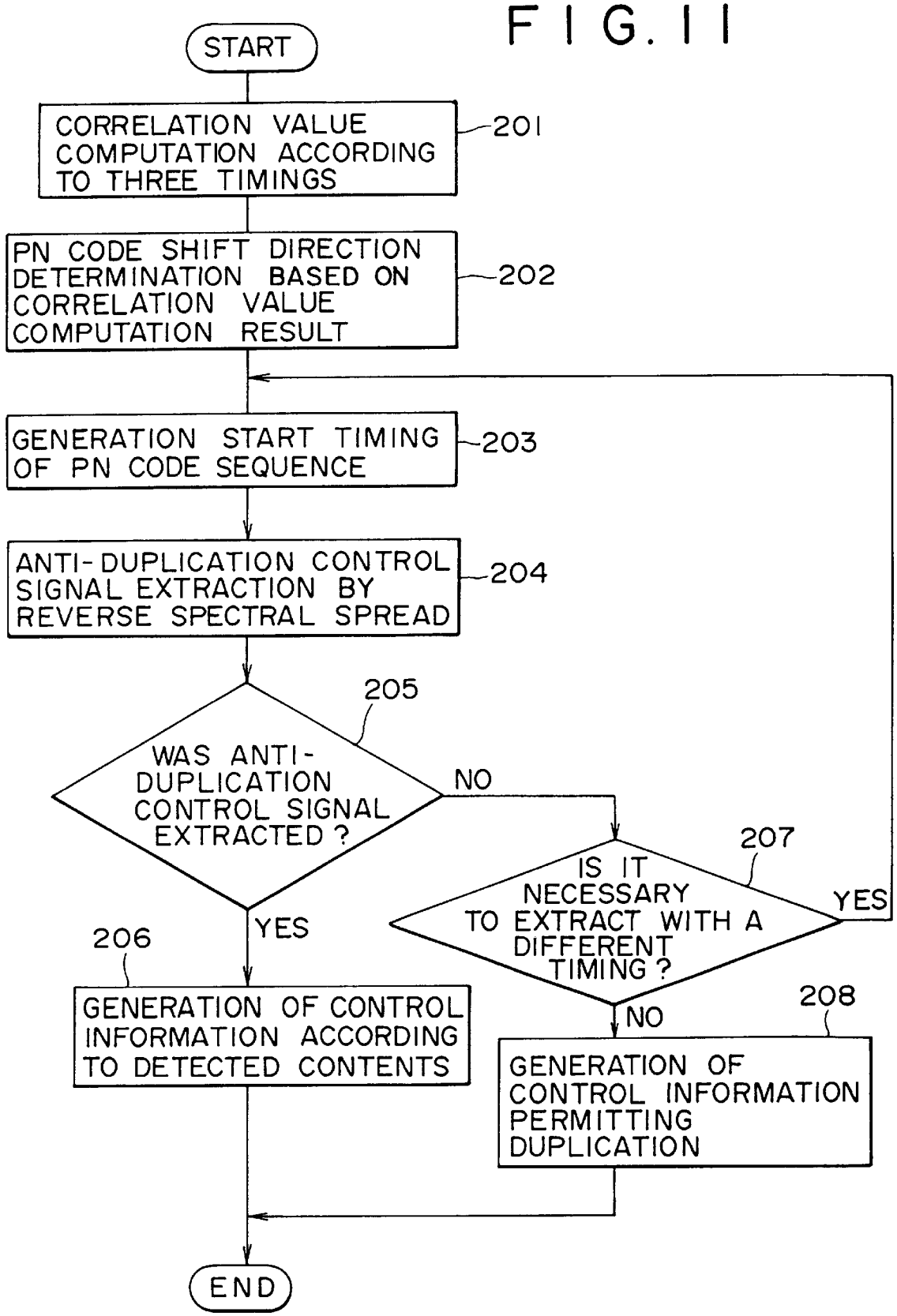

VIDEO SIGNAL TRANSMITTING METHOD, VIDEO SIGNAL OUTPUT DEVICE, VIDEO SIGNAL RECEIVER, VIDEO ANTI-DUPLICATION CONTROL SYSTEM, ADDITIONAL INFORMATION SUPERIMPOSING AND EXTRACTING SYSTEM AND VIDEO SIGNAL RECORDING MEDIUM

BACKGROUND OF THE INVENTION

1. Field of the Invention

This invention relates to a video duplication control system for playing back a video signal recorded on a recording medium, and limiting or preventing the reproduced video signal from being played back and recorded on another recording medium. It also relates to a video playback device, video recording device and video recording medium on which a video signal is recorded which use this video duplication control system.

2. Description of the Related Art

VTR (Video Tape recording devices) are a commonplace feature of modern-day life, and many kinds of software exist which can be played back on a VTR. Digital VTR or DVD (Digital Video Disks) playback devices are now a reality, and provide videos and sound of exceptionally high quality.

There is however a problem in that this great abundance of software can be copied without restriction, and several methods have already been proposed to prohibit this.

For example, for a VTR which outputs an analog video signal, one method to prevent copying uses a difference in the AGC (Automatic Gain Control) system, or in the APC (Automatic Phase Control) system, of the VTR recording device and of a monitor receiver which displays the video.

When the VTR employs AGC using a pseudo sync signal inserted in the video signal, a monitor receiver employs AGC which does not use this pseudo sync signal. In this anti-duplication method using a difference in the type of AGC, a very high level pseudo sync signal is inserted and output in the video signal supplied from the playback VTR to the recording VTR as an AGC sync signal.

When the VTR employs APC using the phase of a color burst in the video signal, the monitor receiver uses a different type of APC. In an anti-duplication method using a difference in the type of APC, the phase of the color burst in the video signal supplied from the playback VTR to the recording VTR is partially reversed.

The monitor receiver which receives the analog video signal from the playback VTR plays back the signal correctly without being affected by the high level pseudo sync signal in AGC or the partial phase reversal of the color burst signal in APC.

On the other hand when a VTR records, on a recording medium, the analog video signal into which pseudo sync signals have been inserted or the analog video signal which has been subjected to color burst phase reversal in the playback VTR as described hereabove, proper gain control or phase control based on the input signal cannot be performed, and so the video signal is not correctly recorded. Even if this signal is played back, therefore, normal picture and sound cannot be obtained.

In the case of a digitized video signal, e.g. in a digital VTR, an anti-duplication code or an anti-duplication control signal comprising, for example, a duplication ranking control code, is added as digital data to the video signal and recorded on the recording medium, so as to prevent or control duplication of the video.

In this case, the playback digital VTR reads the video signal which has been recorded on the recording medium, audio signal and anti-duplication control signal, and supplies them as digital or analog data to a recording digital VTR.

In the digital VTR being used as a recording device, the anti-duplication control signal is extracted from the supplied playback signal, and recording of the playback signal is then controlled based on the anti-duplication control signal. For example, when the anti-duplication control signal comprises an anti-duplication code, the recording digital VTR does not perform recording.

Alternatively, when the anti-duplication control signal comprises a copy ranking control code, recording is controlled by this ranking control code. For example, when the copy ranking code limits duplication to one copy, the digital VTR used for recording adds this anti-duplication code before recording the video signal and audio signal on the recording medium as digital data. It is thereafter impossible to duplicate the video signal from the copy.

Hence, in the case of a digital connection, that is when a video signal, an audio signal and anti-duplication control signal are supplied as digital signals to the digital VTR used as a recording device, anti-duplication control is performed on the recording side using the anti-duplication control signal by supplying this signal to the recording digital VTR as digital data.

However, in the case of an analog connection where the video signal and audio signal are supplied as analog signals, the anti-duplication control signal is lost when the signal supplied to the recording device is D/A converted. Hence, in the case of an analog connection, an anti-duplication control signal must be added to the D/A converted video or sound signal, and this causes deterioration of the video signal and audio signal.

It is, therefore, difficult to add an anti-duplication control signal and to extract it in the recorder for the purpose of anti-duplication control, without causing deterioration of the D/A converted video signal or audio signal.

Conventionally, therefore, duplication was prevented by an anti-duplication method using a difference in the AGC, or a difference in APC characteristics, between the VTR and the monitor receiver as described above.

However, in some cases, when duplication is prevented using the aforesaid difference in the AGC or a difference in APC characteristics between the VTR and the monitor receiver, depending on the type of AGC or APC characteristics on the recording side, the video signal may nevertheless be correctly recorded. In this case, it might happen that duplication cannot be prevented, or that the reproduced video on the monitor receiver is distorted. Further, it was troublesome to change over the anti-duplication method depending on whether there was an analog connection or a digital connection.

The inventors have already proposed a duplication prevention method in which a spectrally spread anti-duplication control signal is superimposed on a video signal (U.S. patent application Ser. No. 08175510). This method may be used for both digital connections and analog connections, and it causes no deterioration of the video or sound which is played back.

According to this method, when the original recording medium is fabricated, a PN (Pseudorandom Noise) sequence code (referred to hereafter as PN code) is generated with a sufficiently fast period and spectrally spread by applying it to the anti-duplication control signal. In this way, a narrow bandwidth, high level anti-duplication control signal is converted to a wideband, low level signal which does not affect the video signal or sound signal. This spectrally spread anti-duplication control signal is then superimposed on the video signal supplied to the recording medium and recorded.

On the recording side, a PN code is generated with the same timing and phase as the PN code used for spectral spread in the playback device. This generated PN code is applied to the video signal on which the anti-duplication control signal is superimposed so as to extract the original anti-duplication control signal, i.e. so as to perform reverse spectral spread. Anti-duplication is then controlled based on the anti-duplication control signal extracted by reverse spectral spread.

In this way, the anti-duplication control signal is spectrally spread and superimposed on the video signal as a wideband, low level signal in the playback device. It is therefore difficult for a person wishing to illegally duplicate the video signal, to remove the anti-duplication control signal which is superimposed on it.

However, it is possible for a person aiming to prevent illegal duplication to detect the superimposed anti-duplication control signal by reverse spectral spread and use that control. This anti-duplication control signal is therefore supplied to the recording device together with the video signal. On the recording side, the anti-duplication control signal is detected, and duplication is precisely controlled according to the detected anti-duplication control signal.

According to this method, as described hereabove, the spectrally spread anti-duplication control signal is superimposed as a wideband, low level signal on the video signal, but it must be superimposed at a lower S/N ratio than that of the video signal in order for the control signal not to cause deterioration of the video signal.

To superpose the spectrally spread anti-duplication control signal at a lower S/N ratio than that of the video signal, and to be able to detect the anti-duplication control signal which has been superimposed on the video signal in the recording device, the number of the PN code (PN code length) required to spectrally expand a 1 bit anti-duplication control signal must be sufficiently large. The PN code length per bit of the anti-duplication control signal may also be expressed as an spread gain (spread factor) which is the ratio (T/TC) of a time width T per bit of the anti-duplication control signal and a time width TC of one part (one chip) of the PN code. As described hereabove, this spread gain is found from the S/N ratio of the information signal on which the anti-duplication control signal is superimposed, in this case the S/N ratio of the video signal.

For example, when the S/N ratio of the video signal on which the anti-duplication control signal is superimposed is 50 dB, the anti-duplication control signal which is spectrally spread and superimposed on the video signal must be superimposed at a lower level than 50 dB, which is the S/N ratio of the video signal. Also, in order to detect the anti-duplication control signal superimposed on the video signal, its S/N ratio must be sufficient for the spectrally spread signal to be fully demodulated. If this S/N ratio is 10 dB, a spread gain of 60 dB (S/N ratio of 50 dB for video signal)+(S/N ratio of 10 dB necessary for detection) is required. In this case, the PN code length per bit of the anti-duplication control signal is 1 million.

The method used in the recording device to detect the PN code superimposed on the video signal uses a multifilter or a sliding correlation. In the former case, detection of the PN code is rapid, but only a short code length can be detected. At present, this code length is of the order of 256, and when the PN code length is 1 million per bit of the anti-duplication control signal, it cannot be detected. In the latter case, PN codes of long length can be detected but the detection takes time. It can thus be appreciated that a considerable time is required to detect a PN code having a length of 1 million.

In the recording device, if the anti-duplication control signal superimposed on the video signal can be extracted rapidly, the duplication control may be performed more effectively and efficiently by superimposing a spectrally spread anti-duplication control signal on the video signal.

SUMMARY OF THE INVENTION

This invention therefore aims to provide a video anti-duplication method, a video anti-duplication device and a video recording medium to permit additional information to be superimposed on a video signal so as to control duplication of the signal without causing its deterioration, and to control such duplication by precisely and rapidly extracting this additional information.

This invention provides a video transmitting method for superimposing a spectrally spread anti-duplication control signal on an analog video signal and transmitting the result, wherein:

a spread code for performing spread is generated in synchronism with a sync signal in the video signal, and the anti-duplication control signal is spectrally spread using the spread code for performing spread.

In the video transmitting method according to this invention:

an analog video signal is received on which an anti-duplication control signal, which has been spectrally spread by a spread code synchronized with the video sync signal, is superimposed, a spread code for performing reverse spread is generated in synchronism with the sync signal in the received video signal, reverse spectral spread is performed using the spread code for performing reverse spread, and the anti-duplication control signal is extracted from the video signal.

In the video transmitting method according to this invention, a spread code is generated, for example, in synchronism with a vertical sync signal in the video signal on both the video signal output side and the video signal receiving side.

By using a sync signal in the video signal in this way, the spread code used for performing spectral spread on the output side can rapidly be synchronized with the spread code used for performing reverse spectral spread on the receiving side.

BRIEF DESCRIPTION OF THE DRAWINGS

FIGS. 4A–4C are diagrams showing relations between a vertical sync signal, PN code and anti-duplication control signal in the video playback device used as the video anti-duplication device according to this invention.

FIGS. 6A–6C are diagrams for the purpose of describing a detection range of the PN code superimposed on a video signal in a video recording device used as the video anti-duplication device according to this invention.

FIGS. 7A–7C are diagrams for the purpose of describing processing for setting the detection range of the anti-duplication control signal in the video recording device used as the video anti-duplication device according to this invention.

FIG. 8 is a flowchart for the purpose of describing operation when the anti-duplication control signal is detected in the video recording device used as the video anti-duplication device according to this invention.

FIGS. 10A–10E are diagrams for the purpose of describing a vertical sync signal and a generation start timing of the PN code in the modification of the video recording device used as the video anti-duplication device according to this invention.

FIG. 11 is a flowchart for the purpose of describing operation when the anti-duplication control signal is detected in the modification of the video recording device used as the video anti-duplication device according to this invention.

DESCRIPTION OF THE PREFERRED EMBODIMENTS

One embodiment of the video transmitting method, video anti-duplication method, video anti-duplication device and video recording medium according to this invention will now be described with reference to the appended drawings.

As will be described in detail hereafter, in the video duplication control system described below, an anti-duplication control signal is spectrally spread and superimposed on the video signal in the video playback device using a PN (Pseudorandom Noise) sequence code (PN code). This code is reverse spectrally spread in the video recording device so as to extract the anti-duplication control signal which is used to control duplication of the video signal.

Figure 1:
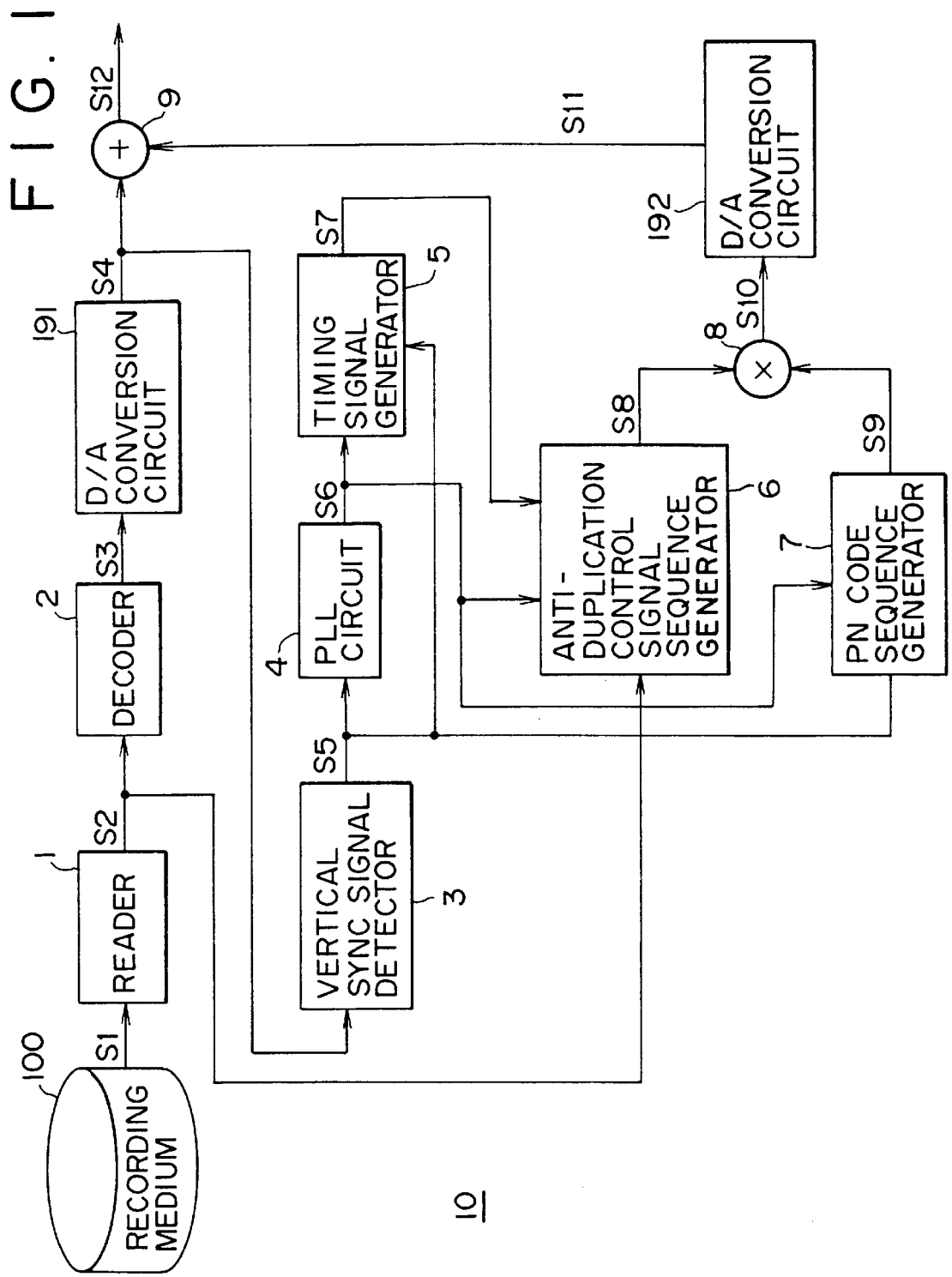
FIG. 1 is a block diagram for the purpose of describing one embodiment of a video playback device used as a video duplication controller according to this invention.
Figure 2:
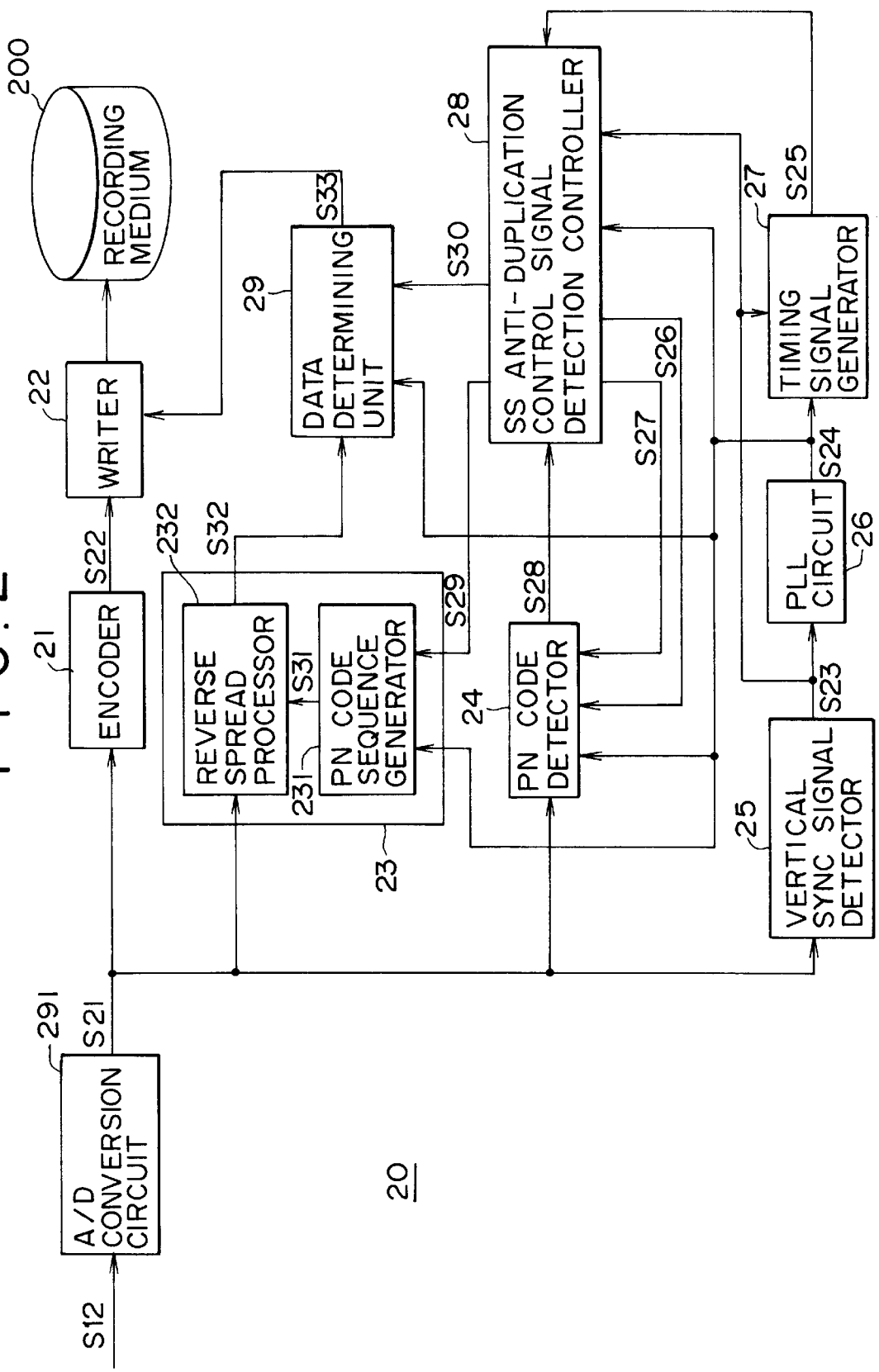
FIG. 2 is a block diagram for the purpose of describing one embodiment of a video recording device used as the video anti-duplication device according to this invention.

FIG. 1 and FIG. 2 are drawings for the purpose of describing a video playback device (referred to hereafter simply as playback device) 10 and a video recording device (referred to hereafter simply as recording device) 20 used in a video duplication control system according to the first embodiment. In other words, the playback device 10 corresponds to the playback system of a DVD device, and the recording device 20 corresponds to the recording system of a DVD device.

In FIG. 1, digitized video and audio signals are recorded together with an anti-duplication control signal as additional information on a recording medium 100, which in this example is a DVD. The anti-duplication control signal may be recorded on the innermost or outermost TOC (Table of Contents) or on the video data or audio data track in a separate recording area from the recording area in which the video or audio data is recorded. In the following description, the latter case is described wherein the anti-duplication control signal is read at the same time as the video data.

According to this example, to simplify the description, the anti-duplication control signal is a one bit signal which either prohibits or permits duplication of the video signal, but it may also be a signal permitting a limited number of copies, e.g. one copy, to be made. This anti-duplication control signal is added to the video signal. The recording medium 100 is installed in the playback device 10 wherein the recorded signal is read.

As shown in FIG. 1, the playback device 10 comprises a reader 1, decoder 2, vertical sync signal detector 3, PLL circuit 4, timing signal generator 5, anti-duplication control signal sequence generator 6, PN code sequence generator 7, multiplier 8, adder 9, and D/A converter circuits 191, 192.

The reader 1 extracts a playback video signal component S2 from a playback signal S1 obtained from the recording medium 100, and supplies it to the decoder 2 and anti-duplication control signal sequence generator 6.

The decoder 2 decodes the playback video signal S2, generates a digital video signal S3 comprising a sync signal and supplies this to the D/A conversion circuit 191. The D/A conversion circuit 191 converts the digital video signal S3 to an analog video signal S4. This analog video signal S4 is supplied to the vertical sync signal detector 3 and adder 9.

The vertical sync signal detector 3 extracts a vertical sync signal S5 from the video signal S4, and supplies this vertical sync signal S5 to the PLL circuit 4, timing signal generator 5 and PN code sequence generator 7.

The PLL circuit 4 generates a clock signal S6 used for performing spectral spread based on the vertical sync signal S5. This clock signal S6 is supplied to the timing signal generator 5, anti-duplication control signal sequence generator 6 and PN code sequence generator 7.

The timing signal generator 5 generates various timing signals according to the vertical sync signal S5 and a clock signal S6. According to this embodiment, the timing signal generator 5 generates a timing signal S7 used in the anti-duplication control signal sequence generator 6 and supplies it to the anti-duplication control signal sequence generator 6.

The anti-duplication control signal sequence generator 6 extracts the anti-duplication control signal added to the playback video signal component S2, and generates an anti-duplication control signal sequence S8 to be superimposed on the video signal from the extracted anti-duplication control signal according to the clock signal S6 and timing signal S7. The anti-duplication control signal sequence S8 generated here is supplied to the multiplier 8.

On the other hand, the PN code sequence generator 7 uses the vertical sync signal S5 as a reset signal, and generates a PN code sequence S9 according to the clock signal S6. The PN code sequence generator 7 repeats generation of the PN code sequence S9 every vertical interval. The PN code sequence S9 is supplied to the multiplier 8.

Figure 3:
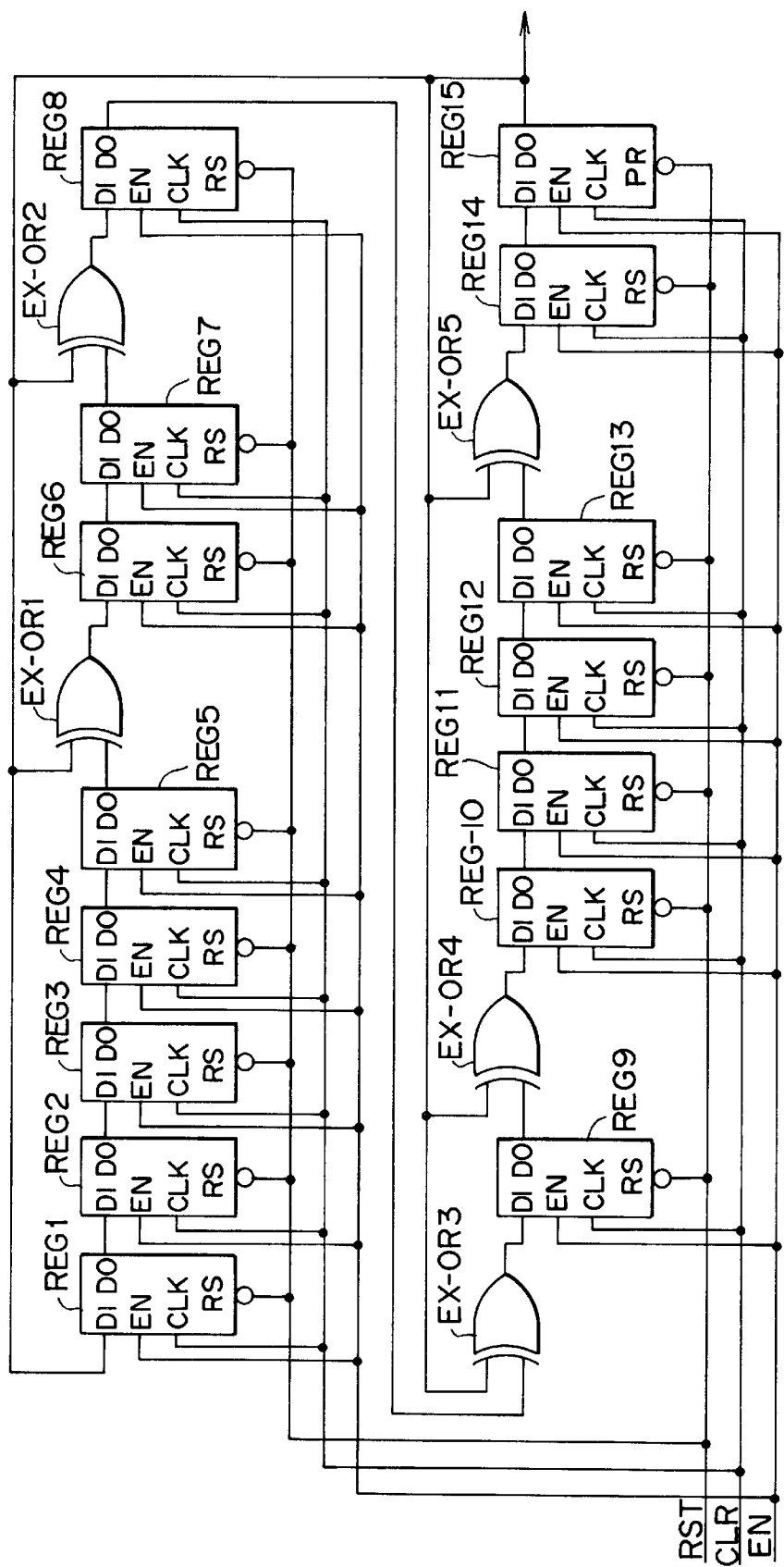
FIG. 3 is a diagram showing a typical construction of a PN code sequence generator of the video playback device shown in FIG. 1.
Figure 5A:
FIGS. 5A–5D are diagrams showing relations between a vertical sync signal, clock signal, PN code and anti-duplication control signal in the video playback device used as the video anti-duplication device according to this invention.
Figure 5B:
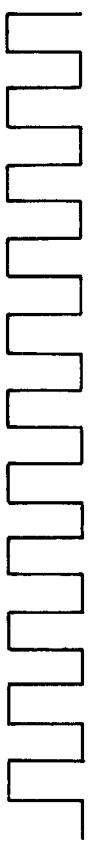
Figure 5C:
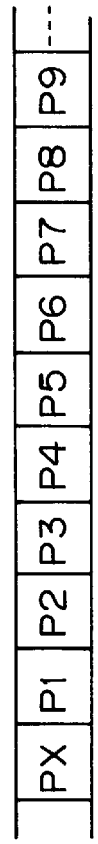
Figure 5D:
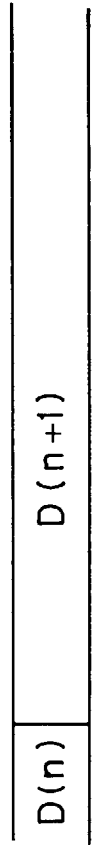

FIG. 3 is a diagram showing a typical construction of the PN code sequence generator 7. The PN code sequence generator 7 in this example comprises 15 D flip-flops REG1–REG15 forming a 15 stage shift register, and exclusive OFF circuits EX-OR1–EX-OR5 for computing a suitable tap output of this shift register. As shown in FIG. 3, it receives a reset signal RST, a clock signal CLK and an enable signal EN, and generates a PN code known as an M sequence.

The PN code sequence generator 7 generates the PN code sequence S9 based on vertical sync signal S5 as the reset signal RST and the clock signal S6. Also although not shown in FIG. 1, the enable signal EN for enabling the PN code sequence generator 7 is for example generated by the timing signal generator 5, and supplied to the PN code sequence generator 7.

In the multiplier 8, a spectrally spread signal S10 is generated by multiplying the anti-duplication control signal sequence S8 by the PN code sequence S9.

FIG. 4 is a diagram showing the timing relation between the vertical sync signal S5, PN code sequence S9 and anti-duplication control signal sequence S8 in the playback device 10.

The PN code sequence is initialized by this vertical sync signal S5 (FIG. 4A), and one period of the PN code sequence S9 (FIG. 4B) is generated every vertical interval. One bit of the anti-duplication control signal sequence S8 (FIG. 4C) is spectrally spread by one period of the PN code sequence S9. In FIG. 4, the header of the PN code sequence S9 coincides with the front edge of the vertical sync pulse, however, it may occur at a predetermined time after the front edge.

FIG. 5 is a diagram describing the timing relation between the vertical sync signal S5, the clock signal S6, the PN code sequence S9 and the anti-duplication control signal sequence S8.

The clock signal S6 is generated using the vertical sync signal S5 as a reference. As described hereabove, the PN code sequence generator 7 is reset by the sync pulse of the vertical sync signal S5 so that one period of the PN code sequence (FIG. 5C) from a PN code P1 to a PN code PX occurs from the header of the sequence (PN code P1) every vertical interval.

Also, using the vertical sync signal S5 as a sync pulse, data in the anti-duplication control signal sequence S8 is changed from an anti-duplication control signal D(n) to an anti-duplication control signal D(n+1) in the next bit of the anti-duplication control signal sequence. Specifically, one bit of data in the anti-duplication control signal is spectrally spread using the PN code sequence S9 generated with a period of one vertical interval.

The spectrally spread signal S10 generated by the multiplier 8 is supplied to the D/A conversion circuit 192. The D/A conversion circuit 192 converts the spectrally spread signal S10 to an analog spectrally spread signal S11, and supplies this to the adder 9.

The adder 9 outputs an analog video signal S12 wherein the analog spectrally spread signal S11 is superimposed on the analog video signal S4. The analog video signal S12 may be supplied to the recording device 20 described hereafter, or it may be supplied to a monitor receiver not illustrated or the like.

The analog spectrally spread signal S11 is a wideband, low level signal, so it does not cause deterioration of the video even when superimposed on the video signal.

Next, the recording device 20 which receives the analog video signal S12 from the playback device 10 and records the video signal will be described.

As shown in FIG. 2, the recording device 20 comprises an encoder 21, writer 22, reverse expander 23, PN code detector 24, vertical sync signal detector 25, PLL circuit 26, timing signal generator 27, detection controller (referred to hereafter as SS anti-duplication control signal detection controller) 28 which controls detection of the spectrally spread anti-duplication control signal, data determining unit 29 and A/D conversion circuit 291. The video signal is written by the recording device 20 on the recording medium 200.

The video signal S12 from the playback device 10 is A/D converted by the A/D conversion circuit 291, and supplied to the encoder 21, reverse spectral expander 23, PN code detector 24 and vertical sync signal detector 25 as a digital video signal S21.

The encoder 21 removes the sync signal from the digital video signal S21, and performs encoding operations such as data compression of the digital video signal. This generates a digital video signal S22 for recording on the recording medium 200, and this is supplied to the writer 22.

As described in the case of the aforesaid playback device 10, the vertical sync signal detector 25 detects the vertical sync signal S23 from the video signal S21 and supplies it to the PLL circuit 26, timing signal generator 27 and SS anti-duplication control signal detection controller 28.

The PLL circuit 26 generates a clock signal S24 used for performing reverse spectral spread based on the vertical sync signal S23. This clock signal S24 is supplied to the reverse spectral expander 23, PN code detector 24, timing signal generator 27, SS anti-duplication control signal detection controller 28 and data determining unit 29.

The timing signal generator 27 generates various timing signals based on the vertical sync signal S23 and clock signal S24. A timing signal S25 which is generated by the timing signal generator 27 is supplied to the SS anti-duplication control signal detection controller 28.

The SS anti-duplication control signal detection controller 28 controls the spectral expander 23, PN code detector 24 and data determining unit 29.

The SS anti-duplication control signal detection controller 28 receives the vertical sync signal S23, clock signal S24 and timing signal S25, generates an enable signal S26 and an initialization signal S27, and controls the PN code detector 24 by supplying these signals to the PN code detector 24.

The PN code detector 24 comprises for example a sliding scale correlation unit and detects a PN code sequence which is spectrally spreading the anti-duplication control signal sequence superimposed on the video signal. The detection result is supplied to the SS anti-duplication control signal detection controller 28 as a signal S28.

The signal S28 output by the PN code detector 24 indicates the strength of the correlation between the PN code sequence generated in the PN code detector 24 and the PN code sequence which is spectrally spreading the anti-duplication control signal sequence. Specifically, when there is a high correlation, the level of the signal S28 is high, and when there is a low correlation, the level of the signal S28 is low.

The SS anti-duplication control signal detection controller 28 determines whether or not a PN code which is spectrally spreading the anti-duplication control signal has been detected, based on the level of the signal S28 from the PN code detector 24. When the level of the signal S28 is equal to or higher than a predetermined level, the SS anti-duplication control signal detection controller 28 determines that a PN code which is spectrally spreading the anti-duplication control signal has been detected, supplies a signal S29 which controls the start timing for generating a PN code sequence used for performing reverse spectral spread to the reverse expander 23, and supplies a control signal S30 for controlling the data determination timing to the data determining unit 29.

The reverse expander 23 comprises the PN code sequence generator 231 and the reverse spread processor 232 as shown in FIG. 2. Herein, the PN code sequence generator 231 has an identical construction to that of the PN code generator 7 described hereabove referring to FIG. 3.

In the PN code sequence generator 231, the timing with which a PN code sequence S13 starts to be generated is controlled by the signal S29 from the SS anti-duplication control signal detection controller 28. The PN code sequence S31 is generated according to the clock signal S24, and is supplied to the reverse spread processor 232. The PN code sequence S31 has the same code pattern as the PN code sequence S9 used in the playback device 10, and is repetitively generated every vertical interval as in the case of the playback device 10.

The reverse spread processor 232 performs reverse spectral spread using the PN code sequence S31 from the PN code sequence generator 231, and extracts an anti-duplication control signal sequence S32 which is superimposed on the video signal S21. The extracted anti-duplication control signal sequence S32 is supplied to the data determining unit 29.

The data determining unit 29 is controlled by the control signal S30 from the SS anti-duplication control signal detection controller 28. The data determining unit 29 interprets the anti-duplication control signal S32, determines whether to permit or prohibit duplication, and generates control information S33 according to the result which is supplied to the writer 22.

When the control information S33 is information for prohibiting writing the writer 22 does not write the video signal S22 on the recording medium 200 so that the video signal supplied by the recording device 10 is prevented from being duplicated. Conversely, when the control information S33 permits duplication, the video signal S22 is written on the recording medium 200 so that the video signal from the playback device 10 is duplicated.

When the level of the signal S28 supplied to the anti-duplication control signal detection controller 28 from the PN code detector 24 is always equal to or less than a predetermined level in for example one vertical interval which is the period in which the PN code is detected, it is determined in the SS anti-duplication control signal detection controller 28 that the anti-duplication control signal is not superimposed on the video signal S21.

In this case, the SS anti-duplication control signal detection controller 28 controls the data determining unit 29 by the control signal S30, generates a control signal to permit duplication, and supplies this signal to the writer 22 as the control signal S33. The video signal supplied by the playback device 10 is then duplicated on the recording medium 200.

Hence, the SS anti-duplication control signal detection controller 28 starts detection of the PN code with a timing in synchronism with the vertical sync signal S23 detected from the video signal S21, as in the case of the playback device 10. As the PN code sequence is started with effectively the same timing in the playback device 10 and recording device 20 relative to the video signal S21, the PN code sequence which is spectrally spreading the anti-duplication control signal sequence superimposed on the video signal S21 can be rapidly detected in the PN code generator 24.

Reverse spectral spread in the reverse expander 23 can therefore also be rapidly and precisely performed.

In the aforesaid playback device 10 and recording device 20, when the PN code sequence is generated in synchronism with the vertical sync signal, synchronism can be achieved by the vertical sync signal, so it is probably not necessary to detect, for example, one period of the PN code in the PN code detector 24 of the recording device 20.

As shown in FIGS. 6A–6C, there may be a slight difference in the start timing of the PN code sequence in the video signal S12 from the playback device 10 (FIG. 6A), and the start timing of the PN code sequence which is generated in synchronism with the vertical sync signal S23 detected by the vertical sync signal detector 25 in the recording device 20 (FIG. 6B), due to the fact that the video signal S21 is affected by time axis errors arising in the transmitting system. To compensate for this difference, the detection range of the PN code sequence which is spectrally spreading the anti-duplication control signal is set using the vertical sync signal as a reference, as shown in FIG. 6C.

Even when there is a difference, this detection range is set so that the header of the PN code sequence is always present. PN code detection in the recording device 20 is then performed within this set detection range. According to this embodiment, the detection range is set so that there is the same time span in the delay direction and the advance direction relative to the front edge of the vertical sync signal, as shown in FIGS. 7A–7C.

Therefore, even when the head P1 of the PN code sequence which is spectrally spreading the anti-duplication control signal sequence superimposed on the video signal, is shifted in the forward direction relative to the front edge of the vertical sync signal detected in the recording device 20 as shown in FIG. 7B, the PN code sequence can be rapidly detected.

In this case, as shown in FIG. 7B, detection of the PN code is performed in the forward direction within a preset detection range. When the PN code is not detected during this forward detection process, detection of the PN code is performed in the backward direction relative to the front edge of the vertical sync signal within a preset detection range. As detection needs to be performed only within this detection range, the required detection time may be reduced.

On the other hand, as shown in FIG. 7C, when detection of the PN code is performed only in the forward direction based on the front edge of the vertical sync signal without setting the detection range of the PN code, detection of the PN code sequence may be performed until the header of the next PN code sequence is detected.

Hence in the PN code detector 24 of the recording device 20, when the detection range for detecting the PN code sequence superimposed on the video signal is set, this range may be set by the timing signal S25 generated by the timing signal generator 27.

When the detection range is set as described hereabove, the range need only be very narrow compared to the case when the PN code sequence is detected for one period of the PN code sequence, so the detection time can be very short.

FIG. 8 is a flowchart for the purpose of describing operation when the anti-duplication control signal which is spectrally spread and superimposed on the video signal S21 in the recording device 20, is detected.

When the vertical sync signal S23 is detected by the vertical sync signal detector 25 of the recording device 20, and the clock signal S24, timing signal S25 which are respectively generated in the PLL circuit 26 and timing signal generator 27 are supplied to the relevant units, the SS anti-duplication control signal detection controller 28, PN code detector 24, reverse expander 23 and data determining unit 29 start the anti-duplication control signal detection shown in FIG. 8.

First, the SS anti-duplication control signal detection controller 28 supplies the aforesaid enable signal S26 and initialization signal S27 to the PN code detector 24, and PN code detection is performed within the set detection range (step 101).

Next, the SS anti-duplication control signal detection controller 28 receives the signal S28 from the PN code detector 24, and it is determined whether or not the PN code sequence which is spectrally spreading the anti-duplication control signal sequence was detected (step 102).

In the determining process of the step 102, when it was determined that the PN code sequence was detected, the SS anti-duplication control signal detection controller 28 supplies the signal S29 which controls the PN code sequence start timing used in reverse spectral spread in the recording device 20 to the reverse expander 23, performs reverse spectral spread, and thereby extracts the anti-duplication control signal which is spectrally spread and superimposed on the video signal (step 103).

Based on this extracted anti-duplication control signal, the data determining unit 29 determines whether or not to permit duplication of the video signal and controls duplication of the video signal accordingly.

In the determining process of the step 102, when it is determined that the PN code sequence was not detected, the SS anti-duplication control signal detection controller 28 controls the data determining unit 29 so as to generate control information to permit duplication (step 104). This control information which permits duplication is supplied to the write unit 22, and the video signal supplied by the playback unit 10 is recorded on the recording medium 200.

In the video anti-duplication system according to this embodiment, by setting a start timing which starts generating the PN code sequence based on the sync signal in the video-signal, generation of the PN code sequence may be started with effectively the same timing relative to the video signal in both the playback device 10 and recording device 20. Consequently, detection of the PN code superimposed on the video signal is performed rapidly, and the anti-duplication control signal superimposed on the video signal may be precisely and rapidly extracted.

Figure 9:
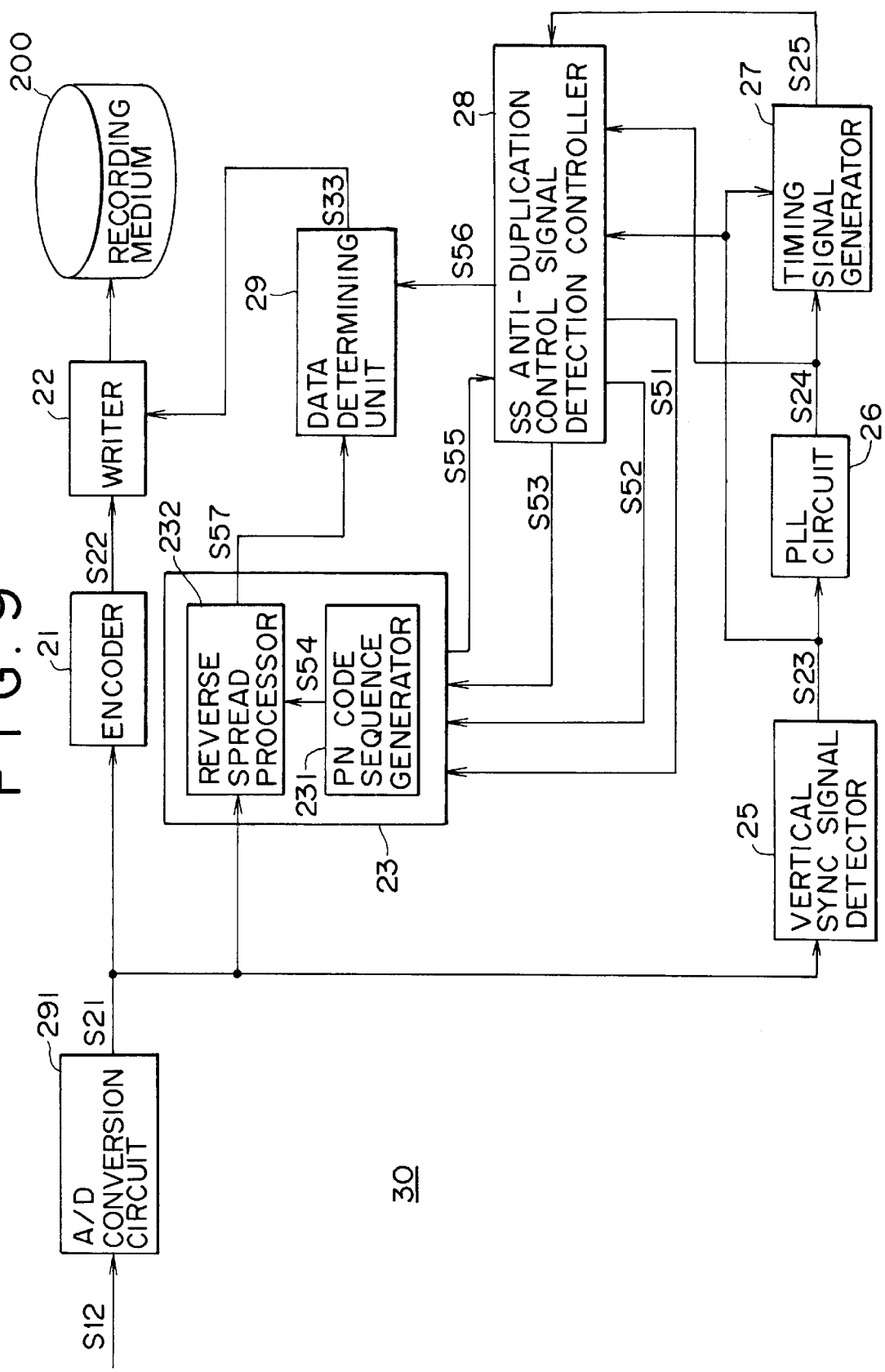
FIG. 9 is a block diagram for the purpose of describing a modification of the video recording device used as the video anti-duplication device according to this invention.

FIG. 9 is a block diagram for describing another example of the video recording device used as the video anti-duplication system of this invention. Herein, a recording device 30 according to this example receives a video signal from the playback device 10 which was described hereabove using FIG. 1, and this is recorded on the recording medium 200.

As described heretofore, in the playback device 10 which outputs a video signal on which the spectrally spread anti-duplication control signal is superimposed and in the recording device 20 which receives the video signal from the playback device 10, a PN code sequence starts to be generated with a timing in synchronism with a vertical sync signal extracted from the video signal. A PN code sequence can therefore be generated with effectively the same timing relative to the video signal in both the playback device 10 and the recording device 20.

As also described above, the timings of the PN code sequence in the received video signal S12 and the generated PN code sequence may actually be slightly different in the recording device due to time axis errors in the transmitting system. Hence as described above, in the recording device 20, detection of the PN code sequence which is spectrally spreading the anti-duplication control signal sequence is performed for example over one period of the PN code sequence or within a preset detection range.

However the video signal is a highly precise signal, and when the PN code sequence is generated in synchronism with a vertical sync signal as described above, it may be assumed that there is no large deviation in sync between the playback device and recording device.

Therefore, according to this example, "trial processing" is performed wherein the PN code sequence is generated with three predetermined timings, and reverse spectral spread is performed using the PN code sequence generated with each timing, so as to accelerate detection of the PN code sequence which is spectrally spreading the anti-duplication control signal sequence.

From the results of reverse spectral spread performed using the PN code sequence generated with each timing, correlation values are found between these PN code sequences generated with each timing and the PN code sequence which is spectrally spreading the anti-duplication control signal sequence. The timing used to start generation of the PN code sequence used for performing reverse spectral spread is set according to the correlation value.

As shown in FIG. 9, the SS anti-duplication control signal detection controller 28 according to this modification controls the reverse expander 23 and data determining unit 29. The SS anti-duplication control signal detection controller 28 receives the vertical sync signal S23, clock signal S24 and timing signal S25, generates an enable signal S51 for operating the reverse expander 23, an initialization signal S52 for controlling the start timing of the PN code sequence and another timing control signal S53, and supplies these signals to the reverse expander 23 so as to control it.

As shown in FIGS. 10A–10E, the SS anti-duplication control signal detection controller 28 sets three timings for starting generation of the PN code sequence based on the vertical sync signal (FIG. 10A), generates PN code sequences for performing reverse spread with these timings, and performs reverse spectral spread as a trial process. According to this modification, three timings are used based on the front edge of the vertical sync signal (FIG. 10A), viz. an advanced timing (FIG. 10B), a timing which coincides with the front edge of the vertical sync signal (FIG. 10C) and a delayed timing (FIG. 10D).

The start timing with which the PN code sequence used for performing reverse spectral spread as a trial process is generated, is set according to the shift of PN code sequence between the playback device 10 and recording device 30. Specifically, the head of the PN code sequence which is spectrally spreading the anti-duplication control signal sequence lies between the delayed timing and the advanced timing as shown in FIGS. 10A–10E, and is set so that the distance of these two timings on the time axis is a minimum.

The reverse expander 23 comprises the PN code sequence generator 231 and the reverse spread processor 232 shown in FIG. 9. The PN code sequence generator 231 is activated by the enable signal S51 from the SS anti-duplication control signal detection controller 28, uses the initialization signal S52 as a timing signal for starting generation of the PN code sequence, generates a PN code sequence S54 used for performing reverse spread according to the timing control signal S53, and supplies this to the reverse spread processor 232. The PN code sequence S54 has the same code pattern as the PN code sequence S9 used in the playback device 10.

Using the PN code sequence S54 from the PN code sequence generator 231, the reverse spread processor 232 performs reverse spectral spread so as to extract the anti-duplication control signal sequence superimposed on the video signal. The reverse spectral expander 23 of this modification supplies a state signal S55 showing the result of reverse spectral spread to the SS anti-duplication control signal detection controller 28. The state signal S55 is a high level signal when there is a high correlation, and is a low level signal when there is a low correlation, between the PN code sequence which is spectrally spreading the anti-duplication control signal sequence and the PN code sequence S54 used for performing reverse spread, as shown in FIG. 10E.

The SS anti-duplication control signal detection controller 28 controls the reverse expander 23 so as to generate the PN code sequence used for performing reverse spread with the aforesaid three timings (FIGS. 10B, C, D) in order, performs reverse spectral spread, and extracts the result of reverse spectral spread as a trial process from the state signal S55. The SS anti-duplication control signal detection controller 28 considers the results of reverse spectral spread performed with the three timings, and sets the generation start timing of the PN code sequence accordingly.

For example, according to the results of reverse spectral spread performed with the three timings, when the level of the signal S55 is low for advanced timing (FIG. 10B), the level of the signal S55 is high for a timing which coincides with the front edge of the vertical sync signal (FIG. 10C), and the level of the signal S55 is somewhat lower for a delayed timing (FIG. 10D), as shown in FIG. 10E, the SS anti-duplication control signal detection controller 28 sets a start timing T1 for generating the PN code sequence used for performing reverse spread between the front edge of the vertical sync signal and the delayed timing, as shown by the arrow T1 in FIG. 10E.

The SS anti-duplication control signal detection controller 28 generates a PN code sequence for reverse spread using the timing signal T1 in order to control the reverse expander 23. The result is supplied to the SS anti-duplication control signal detection controller 28 as the signal S55, and the SS anti-duplication control signal detection controller 28 adjusts the generation start timing of the PN code sequence used for performing reverse spread so as to lie between the front edge of the vertical sync signal and the advanced timing according to the level of the signal S55.

By adjusting the generation start timing of the PN code sequence used for performing reverse spectral spread and performing reverse spectral spread correctly, an extracted anti-duplication control signal sequence S57 is supplied to the data determining unit 29.

The data determining unit 29 interprets the anti-duplication control signal S57 under the control of a signal S56 from the SS anti-duplication control signal detection controller 28, determines whether duplication is permitted or prohibited, generates the control signal S33 according to the result, and supplies it to the writer 22.

When the control signal S33 is information which prohibits writing, the writer 22 does not permit writing of the video signal S22 on the recording medium 200 so that duplication of the video signal from the playback device 10 is prevented. Conversely, when the control signal S33 does permit duplication, the video signal S22 is written on the recording medium 200 so as to duplicate the video signal from the playback device 10.

Further, according to this embodiment, when the PN code sequence is not detected by the reverse expander 23 with any of the timings shown in FIGS. 10B, C and D, the SS anti-duplication control signal detection controller 28 determines that an anti-duplication control signal is not superimposed on the video signal S21.

In this case, the SS anti-duplication control signal detection controller 28 controls the data determining unit 29 by the control signal S56 so as to generate a control signal permitting duplication, and this is supplied to the writer 22 as the control signal S33. In such a case, therefore, the video signal supplied by the playback device 10 is duplicated on the recording medium 200.

FIG. 11 is a flowchart for the purpose of describing operation when an anti-duplication control signal that is spectrally spread and superimposed on the video signal S21, is detected in the recording device 30 of this example.

When the vertical sync signal S23 is detected by the vertical sync signal detector 25 of the recording device 30, and the clock signal S24 and timing signal S25 generated by the PLL circuit 26 and timing signal generator 27 are supplied to the relevant units, the SS anti-duplication control signal detection controller 28, reverse expander 23 and data determining unit 29 start detection of the anti-duplication control signal as shown in FIGS. 10A–10E.

First, the SS anti-duplication control signal detection controller 28 controls the reverse expander 23 so as to generate PN code sequences with the three timings shown in FIGS. 10B, C, D, performs reverse spectral spread, and supplies the result to the SS anti-duplication control signal detection controller 28 as the signal S55. The SS anti-duplication control signal detection controller 28 performs a correlation value computation based on the result of reverse spectral spread performed with these three timings (step 201). The SS anti-duplication control signal detection controller 28 determines the direction of the shift of the PN code sequence according to the result of this correlation value computation (step 202).

The SS anti-duplication control signal detection controller 28 sets the generation start timing of the PN code sequence used for performing reverse spread based on the results of the steps 201, 202 (step 203). The reverse expander 23 is then controlled so as to generate the PN code sequence used for performing reverse spread with the set generation start timing, performs reverse spectral spread, and extracts the anti-duplication control signal sequence superimposed on the video signal (step 204).

Next, the SS anti-duplication control signal detection controller 28 receives the signal S55 from the reverse expander 23, and determines whether or not the anti-duplication control signal superimposed on the video signal was extracted as a detectable signal having at least a predetermined level (step 205).

When it is determined in the determining process of the step 205 that an anti-duplication control signal was extracted as a signal having at least the predetermined level, the SS anti-duplication control signal detection controller 28 controls the data determining unit 29 so as to generate a control signal controlling the writer 22 according to the extracted anti-duplication control signal (step 206), and this signal is supplied to the writer 22 so as to control duplication of the video signal from the playback device 10.

When it is determined in the determining process of the step 205 that an anti-duplication control signal was not extracted as a signal having at least the predetermined level, the SS anti-duplication control signal detection controller 28 determines whether or not to vary the generation start timing of the PN code sequence (step 207). Specifically, the determining process of the step 205 in this example is a process which determines whether or not a PN code sequence which is spectrally spreading the anti-duplication control signal, lies between the advanced timing shown in FIG. 10B and the delayed timing shown in FIG. 10D, based on a trial process in which spectral spread is performed by a PN code sequence generated with three different start timings as described using FIG. 11.

When it is determined in the determining process of the step 207 that there is no PN code sequence which is spectrally spreading the anti-duplication control signal sequence, based on the aforesaid trial process, it is determined that an anti-duplication control signal is not superimposed on the video signal, and the data determining unit 29 is controlled so as to generate a control signal permitting duplication (step 208). This control signal is supplied to the writer 22 so as to inform the writer 22 that duplication is permitted.

Conversely, when it is determined in the determining process of the step 207 that there is a PN code sequence which is spectrally spreading the anti-duplication control signal sequence, based on the aforesaid trial process, the processing of the step S204 and subsequent steps is repeated, and the generation start timing of the PN code sequence used for performing reverse spread is varied so that it lies between the front edge of the vertical sync signal (FIG. 10C) and the delayed timing (FIG. 10D), which is the code shift direction determined in the step 202.

Hence, in the recording device 30 according to this modification, a PN code sequence is generated with three predetermined timings, and by performing reverse spectral spread, a correlation value is found between the PN code sequence generated with each timing and the PN code sequence which is spectrally spreading the anti-duplication control signal. A PN code sequence for performing reverse spectral spread, having a higher correlation with the PN code sequence used for spectrally spreading the anti-duplication control signal, can therefore be generated.

In this way, synchronism is rapidly achieved between the PN code sequence which is spectrally spreading the anti-duplication control signal and the PN code sequence used for performing reverse spectral spread, so the anti-duplication control signal which is spectrally spread and superimposed on the video signal may be precisely and rapidly extracted.

According to this modification, reverse spectral spread was performed using three different timings as shown in FIG. 10, however the invention is not limited to this arrangement, and the correlation value computation may be performed by setting at least two timings, i.e. an advanced timing and a delayed timing. Moreover, by performing the correlation value computation using a plurality of timings, e.g. four or five timings, for generating the PN code sequence, a PN code sequence may be generated that has a stronger correlation with the PN code sequence which is spectrally spreading the anti-duplication control signal than if the correlation value computation is performed with a smaller number of timings.

A combination may also be used of the aforesaid method wherein a time-limited range is set based on the video sync signal in order to detect the PN code sequence which is spectrally spreading the anti-duplication control signal, and the method of this modification wherein at least two timings are defined relative to the video sync signal. A PN code sequence for performing reverse spectral spread is generated with each timing, correlation values are found for each timing, and the generation start timing of the PN code sequence used for performing reverse spectral spread is set.

When there is no shift of the generation start timing of the PN code between the output side and receiving side for the video signal on which the spectrally spread anti-duplication control signal is superimposed, it is not necessary to perform detection of the PN code which is spectrally spreading the anti-duplication control signal superimposed on the video signal as described above. In this case, for example, the PN code sequence may be generated with a timing in synchronism with the vertical sync signal so as to perform reverse spectral spread, and extract the anti-duplication control signal superimposed on the video signal.

The spectrally spread anti-duplication control signal may also be superimposed on the playback device 10 prior to D/A conversion, and D/A conversion performed later.

According to this embodiment, a vertical sync signal was used, but the invention is not limited to this arrangement, it being possible to generate the PN code sequence start timing control signal and clock signal using a horizontal sync signal. Also according to the above embodiment, the PN code sequence start timing was controlled using a vertical sync signal, but the invention is not limited to this configuration. For example, a start timing signal may be generated showing the start of a PN code sequence shifted by a plurality of clock intervals based on the front edge of the vertical sync signal, and if this signal is used, generation of the PN code sequence can always be started at a plurality of clock intervals from the front edge of the vertical sync signal. It will be understood that the start timing of the PN code sequence may be similarly shifted when a horizontal sync signal is used.

In the recording devices 20 and 30 described using FIG. 2 and FIG. 9, when the vertical sync signal is detected during the encoding process performed by the encoder 21, the signal output by the encoder 21 may be supplied to the vertical sync signal detector 25 as a signal for detecting the vertical sync signal. Also, a horizontal sync signal may be used in the recording devices 20 and 30 as in the playback device 10.

Further, in the aforesaid embodiment, generation of the PN code sequence was started every vertical interval, but the invention is not limited to this arrangement. For example, the PN code sequence may be initiated every integral number of vertical or horizontal intervals, or every fraction of an interval. Specifically, generation of the PN code sequence may be started every plurality of vertical intervals, such as every two or three vertical intervals, or every fractional interval obtained by dividing one vertical interval into a plurality of parts, such as every ½ or ⅓ vertical interval.

According to the above embodiment, the anti-duplication control signal added to the video signal of the recording medium 100 was extracted, spectrally spread and then superimposed on the video signal supplied to the recording device, but alternatively, the spectrally spread anti-duplication control signal may first be superimposed on the video signal prior to recording on the recording medium.

Specifically, the anti-duplication control signal is spectrally spread using a PN code sequence which starts to be generated with a timing based on a vertical sync signal or a horizontal sync signal, which is a video sync signal. This spectrally spread anti-duplication control signal is first superimposed on the video signal, and the video signal is then recorded on the recording medium.

When a spectrally spread anti-duplication control signal is first superimposed on the video signal recorded on the recording medium in this way, there is no need to extract the anti-duplication control signal, perform spectral spread and then superpose the spectrally spread anti-duplication control signal on the video signal.

In this case, in the recording devices 20 and 30, reverse spectral spread may be performed using a PN code sequence which starts to be generated with the same timing and the same phase as the PN code sequence used for spectral spread of the anti-duplication control signal which was first superimposed on the video signal recorded on the recording medium as described hereabove.

Further, an anti-duplication control signal generator may be provided in the playback device, the anti-duplication control signal generated in the playback device may be spectrally spread using a PN code sequence generated with a start timing based on the video sync signal as described hereabove, and this spectrally spread anti-duplication control signal superimposed on the output video signal.

In this case, even when no anti-duplication control signal is recorded on the recording medium or no spectrally spread anti-duplication control signal has been superimposed on it, the anti-duplication control signal which is generated by the anti-duplication control signal generator of the playback device, spectrally spread and superimposed on the video signal may be extracted in the recording device and used to control duplication. When the playback device has an anti-duplication control signal generator to generate a PN code sequence, spectrally expand the anti-duplication control signal and superpose it on the video signal in this manner, duplication may be effectively controlled even when there is no anti-duplication control signal on the recording medium itself.

According to the above embodiment, the playback device 10, recording device 20 and recording device 30 were described as DVD devices, but the invention is not limited to this case. For example, the invention may also be applied to VTR, digital VTR, or to video disc or video CD playback and recording devices. Specifically, this invention may be applied equally well to analog instruments such as analog VTR, and digital instruments such as DVD devices.

Further, according to the above embodiment, the anti-duplication controller was described as a DVD playback or recording device, but the invention is not limited to playback or recording devices. For example, the invention may be applied also to the case where a video output device according to this invention is used as a device for outputting television signals in a broadcasting station, and a spectrally spread anti-duplication control signal is superimposed on the transmitted television signal. On the receiving side, reverse spectral spread may be performed so as to extract the anti-duplication control signal sequence superimposed on the video signal, and control duplication of the video signal based on this anti-duplication control signal.

It will moreover be appreciated that this invention may be applied to devices for outputting and receiving video signals when analog video signals are transmitted and received, such as in the case of cable television.

As described hereabove, according to the video transmitting method, video anti-duplication method, video anti-duplication device and video recording medium of this invention, spectral spread and reverse spectral spread of an anti-duplication control signal are performed using an spread code which is repeated with a predetermined period in synchronism with a video sync signal. As a result, by using the video sync signal, generation of the spread code can be started with the same timing relative to the video sync signal on both the output side and the receiving side of a video signal.

Synchronism may thus rapidly be achieved on the receiving side between the spread code which is spectrally spreading the anti-duplication control signal and the spread code used for performing reverse spectral spread, and the anti-duplication control signal superimposed on the video signal may be precisely and rapidly extracted on the receiving side.

Synchronism between the spread code which is spectrally spreading the anti-duplication control signal and the spread code used for performing reverse spectral spread may be more rapidly achieved, and reverse spectral spread performed precisely and rapidly, by detecting the spread code which is spectrally spreading the anti-duplication control signal within a time-limited range based on the video sync signal.

Synchronism between the spread code which is spectrally spreading the anti-duplication control signal and the spread code used for performing reverse spectral spread may also be more rapidly achieved by generating the spread code with at least two timings, i.e. an advanced timing and a delayed timing, relative to the video sync signal, performing reverse spectral spread, and detecting a correlation with the spread code which is spectrally spreading the anti-duplication control signal.

What is claimed is:

1. An apparatus for detecting additional information superimposed on a signal, said apparatus comprising:

timing signal generating means for generating a timing signal from information in said signal;

clock signal generating means for generating a clock signal based on said information in said signal;

code generating means for generating codes in synchronism with said clock signal and said timing signal;

extracting means for extracting said additional information from said signal using said codes; and detecting means for detecting a sync signal in said signal, wherein said extracting means extracts said additional information from said signal by generating a code based on said sync signal and using said code to extract said additional information, an other code is generated with at least two predetermined timings in advance and delay directions relative to said sync signal, a correlation is found between said other code generated with said two timings and said code, and a start timing for generating said code is determined based on said correlation.

2. The apparatus as claimed in claim 1, wherein said timing signal generating means generates said timing signal based on a sync signal in said signal.

3. The apparatus as claimed in claim 2, wherein said signal is a video signal and said sync signal is a vertical sync signal in said signal.

4. The apparatus as claimed in claim 2, wherein said code generating means generates a spread code in synchronism with said clock signal and said timing signal, and said extracting means processes a spread coding process using said spread code for extracting said additional information from said signal.

5. The apparatus as claimed in claim 4, wherein said extracting means processes a spread spectrum process using said spread code for extracting said additional information from said signal.

6. The apparatus as claimed in claim 4, wherein said spread code is composed of a pseudo random noise code.

7. The apparatus as claimed in claim 1, wherein said additional information is an anti-duplication control signal for prohibiting recording of said signal or limiting a number of occasions on which said signal is recorded on a recording medium.

8. The apparatus as claimed in claim 1, wherein said signal comprises main information and sub information, said timing signal generating means generates said timing signal based on said sub information in said signal, said clock signal generating means generates clock signal based on said sub information in said signal, and said extracting means for extracts said additional information from said main information in said signal using said codes.

9. The apparatus as claimed in claim 8, wherein said sub information is sync information of said signal.

10. The apparatus as claimed in claim 8, wherein said main information is playback information, and said sub information is sync information of said signal.

11. The apparatus as claimed in claim 1, further comprising:

detecting means for detecting a sync signal in said signal, wherein said extracting means extracts said additional information from said signal by generating a code based on said sync signal and using said code to extract said additional information, and a generation timing of said code is adjusted to be within a range of a predetermined timing interval in advance and delay directions relative to said sync signal.

12. A method for detecting additional information superimposed on a signal, said method comprising the steps of:

generating a timing signal from information in said signal;

generating a clock signal based on said information in said signal;

generating codes in synchronism with said clock signal and said timing signal;

extracting said additional information signal from said signal using said codes; and detecting a sync signal in said signal, wherein said extracting step extracts said additional information from said signal by generating a code based on said sync signal and using said code to extract said additional information, an other code is generated with at least two predetermined timings in advance and delay directions relative to said sync signal, a correlation is found between said other code generated with said two timings and said code, and a start timing for generating said code is determined based on said correlation.

13. The method as claimed in claim 12, wherein said step of generating a timing signal generates said timing signal based on a sync signal in said signal.

14. The method as claimed in claim 13, wherein said signal is a video signal and said sync signal is a vertical sync signal in said signal.

15. The method as claimed in claim 12, wherein said step of generating codes generates a spread code in synchronism with said clock signal and said timing signal, and said step of extracting processes a spread coding process using said spread code for extracting said additional information from said signal.

16. The method as claimed in claim 15, wherein said step of extracting processes a spread spectrum process using said spread code for extracting said additional information signal from said signal.

17. The method as claimed in claim 16, wherein said spread code is composed of a pseudo random noise code.

18. The method as claimed in claim 12, wherein said additional information is an anti-duplication control signal for prohibiting recording of said signal or limiting a number of occasions on which said signal is recorded on a recording medium.

19. The method as claimed in claim 12, wherein said signal comprises main information and sub information, said timing signal is generated based on said sub information in said signal, said clock signal is generated based on said sub information in said signal, and said additional information is extracted from said main information in said signal using said codes.

20. The method as claimed in claim 19, wherein said sub information is sync information of said signal.

21. The method as claimed in claim 19, wherein said main information is playback information and said sub information is sync information of said signal.

* * * * *